US012398334B2

(12) United States Patent
Robbins et al.

(10) Patent No.: US 12,398,334 B2
(45) Date of Patent: *Aug. 26, 2025

(54) CONTROLLED BLENDING OF TRANSMIX FRACTIONS INTO DEFINED HYDROCARBON STREAMS

(71) Applicant: Texon Midstream, LLC, Houston, TX (US)

(72) Inventors: John Colin Robbins, Houston, TX (US); Gary S. Wawak, Houston, TX (US)

(73) Assignee: Texon Midstream, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,997

(22) Filed: Aug. 24, 2022

(65) Prior Publication Data

US 2023/0279304 A1 Sep. 7, 2023

Related U.S. Application Data

(63) Continuation of application No. 16/815,496, filed on Mar. 11, 2020, now Pat. No. 11,441,088.

(60) Provisional application No. 62/817,081, filed on Mar. 12, 2019, provisional application No. 62/911,285, filed on Oct. 6, 2019.

(51) Int. Cl.
*C10L 1/04* (2006.01)
*G05D 11/13* (2006.01)

(52) U.S. Cl.
CPC .............. *C10L 1/04* (2013.01); *G05D 11/132* (2013.01); *G05D 11/138* (2013.01); *G05D 11/139* (2013.01); *C10L 2200/0423* (2013.01); *C10L 2200/0446* (2013.01); *C10L 2200/0461* (2013.01); *C10L 2290/24* (2013.01); *C10L 2290/543* (2013.01); *C10L 2290/58* (2013.01); *C10L 2290/60* (2013.01)

(58) Field of Classification Search
CPC .... C10L 1/04; C10L 2290/24; C10L 2290/58; C10L 2290/60; C10L 2290/543; G05D 11/132; G05D 11/138; G05D 11/139
See application file for complete search history.

(56) References Cited

U.S. PATENT DOCUMENTS

| | | |
|---|---|---|
| 2,246,875 A | 6/1941 | Carney |
| 2,297,185 A | 9/1942 | Hollander et al. |
| 2,722,826 A | 11/1955 | Milligan et al. |
| 2,937,140 A | 5/1960 | Stinson |
| 3,009,789 A | 11/1961 | Jordan et al. |
| 3,179,291 A | 4/1965 | Umbach et al. |
| 3,192,473 A | 6/1965 | Marsh |
| 3,342,199 A | 9/1967 | McEvoy |
| 3,385,680 A | 5/1968 | Feld et al. |
| 3,410,293 A | 11/1968 | Ernyei |
| 3,484,590 A | 12/1969 | Stanton |
| 3,751,644 A | 8/1973 | Mayer |
| 3,813,925 A | 6/1974 | Fenske et al. |
| 3,900,391 A | 8/1975 | Merrill, Jr. |
| 3,904,508 A | 9/1975 | Whyte, Jr. et al. |
| 3,999,959 A | 12/1976 | Balek |
| 4,268,701 A | 5/1981 | Vu et al. |
| 4,523,928 A | 6/1985 | Hillman et al. |
| 4,543,819 A | 10/1985 | Chin et al. |
| 4,867,198 A | 9/1989 | Faust |
| 4,876,653 A | 10/1989 | McSpadden et al. |
| 4,882,041 A | 11/1989 | Scott |
| 4,901,559 A | 2/1990 | Grabner |
| 5,004,850 A | 4/1991 | Wilson |
| 5,093,533 A | 3/1992 | Wilson |
| 5,133,391 A | 7/1992 | Johansson et al. |
| 5,163,586 A | 11/1992 | Zinsmeyer |
| 5,193,594 A | 3/1993 | Johansson et al. |
| 5,198,597 A | 3/1993 | O'Young et al. |
| 5,208,402 A | 5/1993 | Wilson |
| 5,271,526 A | 12/1993 | Williams |
| 5,344,044 A | 9/1994 | Hayden |
| 5,423,607 A | 6/1995 | Jones et al. |
| 5,430,295 A | 7/1995 | Le Febre et al. |
| 5,462,650 A | 10/1995 | Takito et al. |
| 5,484,614 A * | 1/1996 | Clem .................. G05D 11/132 426/519 |
| 5,542,450 A | 8/1996 | King et al. |
| 5,823,669 A | 10/1998 | Jones |
| 5,860,457 A | 1/1999 | Andersson |
| 5,975,353 A | 11/1999 | Finlayson |
| 5,979,705 A | 11/1999 | Kaehler et al. |

(Continued)

FOREIGN PATENT DOCUMENTS

| | | |
|---|---|---|
| WO | 2010083077 A1 | 5/2014 |
| WO | 2017/214058 A1 | 12/2017 |

(Continued)

OTHER PUBLICATIONS

Kram J, No need to splashm Biodiesel Magazine (Jan. 17, 2006).
Multi-Stream Blender Description and Technical Specifications; Honeywell Enraf Americas Inc.; Mar. 2009 Honeywell International Inc.
International Search Report and Written Opinion issued in corresponding International Application No. PCT/US17/42509 on Oct. 12, 2017.
Office Action issued in corresponding Canadian Patent Application No. 2,936,755 on Sep. 8, 2017.
EPA Q & A Date Oct. 3, 1994, Abstract.
Vanderbur; Butane Supply and Blending Agreement MCE Blending LLC, Feb. 7, 2000.
Greenfield 00165, various letters, reports and receipts dated Dec. 6, 1993 through Mar. 8, 1994.
Greenfield 00101, various internal correspondence work orders, supply agreements, Aug. 19, 1993 through Apr. 18, 1995.

(Continued)

*Primary Examiner* — Randy Boyer
(74) *Attorney, Agent, or Firm* — Clark Sullivan

(57) ABSTRACT

Automated methods and systems for blending high sulfur hydrocarbons, particularly those derived from transmix, into low sulfur hydrocarbon streams are provided. Also provided are methods for splitting transmix into usable hydrocarbon fractions and blending the fractions back into defined hydrocarbon streams.

17 Claims, 2 Drawing Sheets

(56) References Cited

U.S. PATENT DOCUMENTS

| | | | |
|---|---|---|---|
| 6,026,991 | A | 2/2000 | Matthews |
| 6,109,286 | A | 8/2000 | Johnston |
| 6,161,060 | A | 12/2000 | Collins |
| 6,163,738 | A | 12/2000 | Miller |
| 6,258,987 | B1 | 7/2001 | Schmidt et al. |
| 6,328,772 | B1 | 12/2001 | Scott et al. |
| 6,540,797 | B1 | 4/2003 | Scott et al. |
| 6,679,302 | B1 | 1/2004 | Mattingly et al. |
| 7,032,629 | B1 | 4/2006 | Mattingly et al. |
| 7,631,671 | B2 | 12/2009 | Mattingly et al. |
| 8,176,951 | B2 | 5/2012 | Mattingly et al. |
| 8,192,510 | B2 | 6/2012 | Mattingly et al. |
| 8,506,656 | B1 | 8/2013 | Turocy |
| 8,597,380 | B2 | 12/2013 | Buchanan |
| 8,748,677 | B2 | 6/2014 | Buchanan |
| 9,080,111 | B1 | 7/2015 | Huff et al. |
| 11,441,088 | B2 * | 9/2022 | Robbins ............... G05D 11/139 |
| 2005/0022446 | A1 | 2/2005 | Brundage et al. |
| 2005/0058016 | A1 | 3/2005 | Smith et al. |
| 2006/0074256 | A1 | 4/2006 | Alasti |
| 2006/0213554 | A1 | 9/2006 | Welch |
| 2006/0278304 | A1 | 12/2006 | Mattingly et al. |
| 2007/0034550 | A1 | 2/2007 | Hedrick |
| 2008/0000836 | A1 | 1/2008 | Wang et al. |
| 2009/0000396 | A1 | 1/2009 | Kawanishi |
| 2009/0316139 | A1 | 12/2009 | Shrestha |
| 2010/0039884 | A1 | 2/2010 | Weathers |
| 2010/0175313 | A1 | 7/2010 | Mattingly et al. |
| 2010/0211329 | A1 | 8/2010 | Farquharson |
| 2010/0313467 | A1 | 12/2010 | Lake |
| 2012/0216453 | A1 | 8/2012 | Mattingly et al. |
| 2013/0225883 | A1 | 8/2013 | Mattingly |
| 2014/0229010 | A1 | 8/2014 | Farquharson |
| 2015/0053304 | A1 | 2/2015 | Huwyler |
| 2016/0068775 | A1 | 3/2016 | Mattingly |
| 2019/0359905 | A1 | 11/2019 | Lanni |

FOREIGN PATENT DOCUMENTS

| | | | |
|---|---|---|---|
| WO | WO-2018017528 A1 * | 1/2018 | ......... F16K 37/0091 |
| WO | 2018148087 A1 | 8/2018 | |

OTHER PUBLICATIONS

Greenfield 00001, various correspondence, reports and receipts; Notice of Hearing of Appeal, Zoning Appeal Board Order, Operating and Procedures Manual Apr. 27, 1993 through Dec. 14, 1993.

Correspondence from Director of Compliance Programs, US Department of Labor to President, Mid-Continent Company Inc.; Confirmation that mixing of liquefied butane, transferred by a CTMV, with gasoline stored in atmospheric tanks at terminals is not covered by the PSM Standard dated May 17, 1995.

Correspondence from MCE Blending to U.S. Department of Labor OSHA regarding Process Safety Management Program required by OSHA; Feb. 6, 1995.

Grabner Instruments, "About Vapor Pressure Testing," from Grabner Instruments website, 2013.

Haskell, N.B. et al., Front-End Volatility of Gasoline Blend Industrial and Engineering Chemistry, vol. 34, No. 2, Feb. 1942, pp. 167-170.

Stewart, W.E., "Predict RVP of Blends Accurately," Petroleum Refiner, vol. 38, No. 6, Jun. 1959, pp. 231-234.

Standard Test Method for Vapor Pressure of Petroleum Products (Reid Method); from Organic website (http://organic.ulsan.ac.kr/reid.html), 2013.

Vazquez-Esparragoza, J. et el., "How to Estimate Reid Vapor Pressure (RVP) of Blends," Bryan Research & Engineering, Inc., website, Encyclopedia of Chemical Processing and Design, vol. 47, pp. 415-424; Hydrocarbon Processing, Aug. 1992, pp. 135-138.

Compliance Monitoring for Vapor Pressure or Vapor-Liquid Ratio Temperature, MiniVap On-line Petrolab Company website, 2013.

Spectro, "Sulfur Monitors and Analyzers for Fuels and Oils," from Spectro website, 2013.

Sindie, "Sindie On-line Analyzer," from Sindie website, 2013.

Reynolds, Robert E., "The Current Fuel Ethanol Industry Transportation, Marketing, Distribution, and Technical Considerations," Downstream Alternatives Inc., May 15, 2000.

Monder, Dayadeep S., Real-Time Optimization of Gasoline Blending with Uncertain Parameters, University of Alberta, Spring 2001.

International Search Report and Written Opinion issued Mar. 5, 2010 in International Patent Application No. PCT/EP10/20207.

International Search Report and Written Opinion, dated May 2, 2014, which issued during the prosecution of International Patent Application No. PCT/US2013/038761, which corresponds to the present application.

International Search Report and Written Opinion, dated Jun. 10, 2014, which issued during the prosecution of International Patent Application No. PCT/US2013/069447, which corresponds to the present application.

Timothy R. Harbert; Automation Improvements in Batch Cutting Process: The Last Profit Center for Pipelines; American Society of Mechanical Engineers; 2008 7th International Pipeline Conference; Paper No. IPC2008-64392, pp. 623-628; 6 pages (Abstract).

Third Party Submission Under 37 CFR 1.290 Concise Description of Relevance for U.S. Appl. No. 15/430,274, filed Jun. 20, 2017.

Jones J.D et al., Hydrocarbon Processing (May 2000 Issue) pp. 85-89.

EPA Regulatory Announcement 420-F-06-039 (May 2006).

Thermo Scientific, SOLA® II Sulfur Online Analyzer (accessed at https://assets.thermofisher.com/TFS-Assets/LSG/Specification-Sheets/D10617~.pdf on Jan. 17, 2018).

X-Ray Optical Systems, Sindie® On-Line Sulfur Analyzer (accessed at https://www.bartec.de/ProdCatalogue/Assets/Datasheets/Ing_0/Sindie_E.pdf on Jan. 17, 2018).

Jiskoot Quality Systems, In Line Blending Systems (accessed at http://www.jiskoot.com/files/1114/1691/7164/BB001_In_Line_Blending.pdf on Jan. 17, 2018.

Jiskoot Quality Systems, Ratio Blending Calculator (accessed at http://www.jiskoot.com/services/calculations/ratio-blending-index/ on Jan. 17, 2018).

International Search Report and Written Opinion issued in corresponding International Application No. PCT/ JS20/22000 on Jun. 9, 2020.

Applications,Gas Liquid Identification Analysis and Sampling, JP3 Measurement, LLC, 2020, Austin, TX, 6 pp.

Kumar, Devika Krishna and Hampton, Liz, Colonial Pipeline Plan to Cut off Dirty Jet Fuel Could Hit Airlines, Reuters, 2017, 33 pp.

United States Environmental Protection Agency, Regulatory Announcement, Refiner and Importer Quality Assurance Requirements for Downstream Oxygenate Blending and Requirements for Pipeline Interface, Office of Transportation and Air Quality, EPA420-F-06-039May 2006, 7 pp.

Jiskoot Quality Systems, In-Line Blending Systems, Cameron International Corp, BB-001-1101-4, 2011, 8 pp.

Jiskoot Quality Systems, Ration Blending Calculator, Cameron International Corp, 2014, 2 pp.

Jones, et al., Use an Integrated Two-Tower Process to Separate Transmix, Increasing complexities and variations of fuels challenge distilling pipeline byproducts imto gasoline and diesel-fuel products, Reprinted from: Hydrocarbon Processing magazine, May 2000, p. 85-89.

VeraSIGHT Optical Flow Cell, In-Line Multi-Stream Measurement of Hydrocarbon Composition, API Gravity, Vapor Pressure, BTU, and Other Properties in Natural Gas, NGL, Condensate, Crude Oil and Refined Products, JP3 Measurement, LLC, 2016, Austin, TX, 2 pp.

Verax SSG Analyzer, Single-Stream Measurement of Hydrocarbon Composition, BTU, Relative Density and Other Properties for Natural Gas, JP3 Measurement, LLC, Verax SSG Technical Specs, Mar. 2016, Austin, TX, 2 pp.

Verax SSL Analyzer, Single-Stream Analysis for Crude, Condensate, Natural Gas Liquids and Refined Products, JP3 Measurement, LLC, Verax SSL Technical Specs, Mar. 2018, Austin, TX, 2 pp.

(56) References Cited

OTHER PUBLICATIONS

Verax VPA, Vapor Pressure Analyzer (RVP, VPCRx, & TVP) for Crude Oil, Condensate, NGL, and Refined Fuels, JP3 Measurement, LLC, Nov. 2017, Austin, TX, 2 pp.
Pantoja et al, Application of Near-Infrared Spectroscopy to the Characterization of Petroleum, Analytical Characterization Methods for Crude Oil and Related Products, First Edition, John Wiley & Sons Ltd. Published 2018, 23 pp.
Sindie On Line, XOS, Sulfur Process Analyzer for Petroleum Fuels, X-Ray Optical Systems, Inc., 2007, New York, 4 op.
Thermo Schientific: Sola II Sulfur Online Analyzer, Thermo Fisher Scientific, 2015, 4 pp.
Auers, John R. et al., Economic and Supply Impacts of a Reduced Cap on Gasoline Sulfur Content, Prepared for the American Petroleum Institute by Turner, Mason & Company, Dallas, Feb. 2013, 52 pp.
Ultraclean Fuel considers that there are a number of specific market opportunities available to it that will suit the Ultrex® Process, Ultraclean Fuel Ltd., 2017 4 pp.
Verax SSG/SSL, Verax SSG and SSL are cost e ective single stream optical analyzers for the oil and gas industry, Verax SSG Spec Sheet, JP3 Measurement, LLC, Austin, TX,2020, 3 pp.
Verax VPA, Verax VPA™ is the first optical, online, real-time, vapor pressure analyzer for crude, condensate and NGL streams available to the Oil & Gas industry, JP3 Verax VPA Spec Sheet, JP3 Measurement, LLC, Austin, TX,2020, 4 pp.

\* cited by examiner

CONTROLLED BLENDING OF TRANSMIX FRACTIONS INTO DEFINED HYDROCARBON STREAMS

FIELD OF INVENTION

The present invention relates to methods for the controlled blending of transmix fractions into defined hydrocarbon streams without violating pre-set physical property limits for the resulting hydrocarbon stream. The present invention also relates to methods of processing transmix for subsequent addition to defined hydrocarbon streams.

BACKGROUND OF INVENTION

Transmix is created when products of different specifications are shipped sequentially on a pipeline. The pipeline operator might ship a volume of distillate (aviation turbine fuel or Ultra Low Sulfur Diesel, etc.) followed by a volume of gasoline intended for automobiles. When these two products meet in the pipeline at an interface, a quantity of off-specification product referred to as "transmix" is created. Because no mechanical buffer is used to prevent the two products from mixing and becoming contaminated at this interface, the transmix does not meet approved specifications for most fuel products and cannot be used in commerce without further processing.

In the United States, pipelines ship motor gasoline, diesel fuel, jet fuel, naphthas, LPG, diluent, butane, propane, pentane, and other hydrocarbon products on the same clean pipeline. Both refineries and petroleum terminals ship on these common carrier pipelines in varying sizes or batches. A batch is the volume of a product shipped on the pipeline meeting a pre-defined set of product specifications. The pipeline companies and various regulatory authorities publish product specifications that shippers on the pipeline are required to meet before introducing their products into the pipeline. The pipeline company must ensure that the products it eventually releases into commerce meet these specifications. Shippers must provide a certified analysis of products they introduce to the pipeline verifying that their products satisfy the relevant specifications.

All multi-product pipelines create a volume of transmix that is not marketable for use in commerce. This transmix may be composed, for example, of previously certified gasoline (including previously certified gasoline blendstocks that become commercial gasoline solely upon the addition of an oxygenate), distillate fuel (such as diesel, aviation fuel, kerosene and heating oils), and other certified product types. Problems from the creation of transmix are particularly acute when diluents, ultra-low sulfur diesel, aviation turbine fuel, and gasoline are shipped next to each other.

The United States Environmental Protection Agency ("EPA") defines interface and transmix in regulations at 40 C.F.R. 80.84, and prescribes processes that pipeline operators must follow to dispose of transmix. Transmix must typically be re-processed before it can once again be marketed in commerce. The value of transmix is thus lower than the hydrocarbon products from which the transmix derives, and it is in the commercial interest of pipelines and pipeline shippers to minimize this transmix.

Presently, pipeline operators monitor the specific gravity, flash point, haze and color of batched products to determine when transmix is present and when on-specification products are in the pipeline. Based on their standard operating procedures, the pipeline operator will direct the transmix to a transmix storage tank when it reaches a particular juncture on the pipeline, where it can be stored for eventual shipment to a transmix processing plant. Once the transmix has been completely diverted from the pipeline, and on-specification products are once again flowing past this juncture, the operator will resume the product flow through the pipeline and direct the on-specification product to other tanks in the tank farm for eventual distribution to customers and in commerce.

Transmix diverted from the pipeline is commonly processed either on-site or off-site by separating the distillate fraction from the gasoline fraction, typically via distillation, to produce what is referred to as "transmix distillate" and "transmix gasoline." The transmix distillate will commonly include different types of distillate that the pipeline has carried, and the transmix gasoline will commonly include different types of gasoline that the pipeline has carried. Once separated, these fractions are occasionally added back to tanks of distillate or gasoline at a tank farm. When transmix is added to a fuel tank that has previously been certified for compliance with applicable specifications, the product in the tank must often be recertified. This recertification process includes several specifications, most especially for sulfur, which can be introduced to the transmix pool by high-sulfur content fuels such as aviation fuel, fuel oils, or high sulfur diesel. Even though the sulfur in transmix pools derives principally from distillate streams, the sulfur can contaminate both distillate and gasoline fractions and thereby limit the amounts of transmix distillate and transmix gasoline that can be blended back into certified fuels.

Jones J. D. et al., Hydrocarbon Processing (May 2000 Issue) pp. 85-89, describes an integrated two tower process in which the first tower separates transmix into diesel and gasoline fractions, and the second tower separates the diesel into high sulfur and low sulfur fractions. The publication mentions that the transmix fractions can be blended into on-specification products, but it does not give any detail on how such blending would work.

EPA Regulatory Announcement 420-F-06-039 (May 2006), discusses quality assurance requirements for transmix, particularly as they relate to RBOB, and notes that transmix is occasionally blended back into gasoline in very small percentages (<0.25%), at locations where it is inconvenient or too expensive to send the transmix to a processing facility.

Thermo Scientific, SOLA® II Sulfur Online Analyzer (accessed at https://assets.thermofisher.com/TFS-Assets/LSG/Specification-Sheets/D10617~.pdf on Jan. 17, 2018), discloses the SOLA® II Sulfur Online Analyzer, and states that the analyzer "enables petroleum refiners to make timely process adjustments to enhance the economic efficiency of desulfurization and fuel blending operations."

X-Ray Optical Systems, Sindie® On-Line Sulfur Analyzer (accessed at https://www.bartec.de/ProdCatalogue/Assets/Datasheets/lng_0/Sindie_E.pdf on Jan. 17, 2018), discloses the Sindie® On-Line Sulfur Analyzer and states that the analyzer is useful for "Pipeline terminals: interface cuts and tank contamination prevention," including "Continuous monitoring with programmable response times: −10 seconds: ideal for pipeline interface cuts."

Jiskoot Quality Systems, In Line Blending Systems (accessed at http://www.jiskoot.com/files/1114/1691/7164/BB001_In_Line_Blending.pdf on Jan. 17, 2018), discloses: "Diesel blending: Higher specification, lower cost diesel can be produced by in-line blending. Blenders can be designed to take major components directly from process units to minimize intermediate tank storage. Using analyzers for Sulphur and the blended diesel can be produced to an exact environmental specification."

Jiskoot Quality Systems, Ratio Blending Calculator (accessed at http://www.jiskoot.com/services/calculations/ratio-blending-index/on Jan. 17, 2018), discloses: "This on-line calculator, which is designed for blending two liquid hydrocarbons, will assist you to develop the optimal blend ratio and specification for your application. It will calculate the blend ratio (volume or mass) required to achieve target blend density, viscosity or sulphur parameters based on component specifications."

Mattingly et al., WO 2007/124058 (published Nov. 1, 2007), discloses versatile systems for continuous blending of butane into petroleum streams, and further discloses a sulfur sampling and monitoring unit that ensures that the supply of butane does not exceed specified limitations for sulfur in butane that is blended into gasoline. The sampling unit "removes samples of butane from the butane supply line preferably at least once every 500,000 gallons, and the sulfur content of the samples is determined either offline in a laboratory, or in-line using an automated sulfur monitor that allows the butane is returned to the butane supply line after testing."

What is needed are methods and systems for recycling transmix fuels back into commercial fuel streams without causing the commercial fuel streams to violate pre-specified limits on sulfur and other physical properties. Ideally, the methods and systems could be performed continuously, and the recipient commercial fuel stream could be continuously recertified post-blending to confirm the fuel stream meets applicable standards and specifications.

One object of the current invention is to process transmix fuels so that they can be reintroduced to commercial fuel streams, by separating the transmix fuel into transmix fractions suitable for blending into commercial fuel streams.

Another object of the current invention is to provide specifications for transmix blendstocks, and methods of analyzing transmix blendstocks for compliance with the specifications.

Another object of the invention is to provide methods and systems for blending transmix fractions into commercial fuel streams in a manner that does not cause the commercial fuel stream to violate specifications and limits on sulfur and other physical properties.

Still another object of the current invention is to provide methods and systems for blending transmix fractions that comprise one type of gasoline or distillate into a gasoline or distillate stream comprising a different type of gasoline or distillate.

Another object of the current invention is to provide automated and continuous methods and systems for certifying that fuel streams into which transmix has been blended continue to satisfy all relevant specifications and standards.

SUMMARY OF THE INVENTION

After intensive research and investigation, the inventors have developed versatile systems and methods for blending off-specification transmix fractions into defined hydrocarbon streams that comply with applicable ASTM standards and industry specifications. The systems and methods are particularly useful for blending transmix distillate fractions, including fractions that include multiple types of distillates, into a certified distillate stream such as an ultra-low sulfur diesel stream. The systems and methods are also particularly useful for blending transmix gasoline fractions, including fractions that include multiple types of gasoline, into certified gasoline streams. The systems and methods can be practiced on-site where the transmix is generated without shipping the transmix off-site to a transmix processor, or they can be practiced using transmix fractions generated off-site and returned to the pipeline or tank farm for blending. The systems and methods can also be practiced without treating the transmix, the transmix distillate, or the transmix gasoline to remove excess sulfur.

Thus, in a first principal embodiment, the invention provides a system for blending off transmix into a defined hydrocarbon stream without violating a pre-determined physical property limit comprising: (a) a defined hydrocarbon stream comprising a hydrocarbon flow rate, a hydrocarbon value for the physical property, and either distillate or gasoline; (b) a fractional transmix stream in fluid communication with the defined hydrocarbon stream comprising a fractional transmix stream flow rate, a fractional transmix stream value for the physical property, and either distillate or gasoline; (c) a blended stream comprising a combination of the fractional transmix stream and the hydrocarbon stream comprising a blended flow rate, a blended value for the physical property, and either distillate or gasoline; (d) an IPU on which is stored a maximum value of the physical property for the hydrocarbon stream, programmed to calculate a ratio or rate at which the fractional transmix stream can be added to the hydrocarbon stream based on the maximum value and a measured value for the physical property of at least one of the fractional transmix stream, the hydrocarbon stream, and the blended stream; (e) a sampler and a physical property analyzer at a sampling point on at least one of the fractional transmix stream, hydrocarbon stream or blended stream in electronic communication with the IPU, electronically configured to withdraw samples from the fractional transmix stream, hydrocarbon stream or blended stream, measure the physical property of the fractional transmix stream, hydrocarbon stream or blended stream, and transmit or make accessible the measured physical property to the IPU; and (f) a flow regulator interposed between the transmix and hydrocarbon streams, in electronic communication with the IPU, electronically configured to receive or access the rate or ratio from the IPU and adjust the transmix flow rate without exceeding the rate or ratio.

In a second principal embodiment the invention provides a method for blending off transmix into a defined hydrocarbon stream without violating a pre-determined physical property limit comprising: (a) providing the system of the first principal embodiment; (b) withdrawing samples periodically by the sampler from the defined hydrocarbon stream, the fractional transmix stream, or the blended stream, measuring the physical property of the hydrocarbon stream, the fractional transmix stream, or the blended stream by the analyzer, and transmitting or making accessible via the electronic communication the physical property measurement to the IPU; (c) calculating on the IPU a ratio or rate at which the fractional transmix stream can be added to the defined hydrocarbon stream based on the physical property limit and the physical property measurement of the hydrocarbon stream, the fractional transmix stream, or the blended stream; (d) receiving or accessing the ratio or rate by the flow regulator from the IPU, and adjusting the transmix flow rate through the flow regulator without exceeding the rate or ratio.

The methods of the present invention are particularly relevant when blending high sulfur hydrocarbons into low sulfur hydrocarbon streams, and can be used in such blending without causing the recipient low sulfur stream to violate pre-specified limits on sulfur and other physical properties, regardless of the hydrocarbon type into which the high sulfur hydrocarbon is being blended. The systems and methods can be used whenever the recipient hydrocarbon stream has limits on sulfur or other physical properties and the additive stream has the potential to breach those limits.

Thus, in a third principal embodiment the invention provides a system for blending off hydrocarbon sulfur into a defined hydrocarbon stream without violating a pre-determined sulfur concentration limit comprising: (a) a defined hydrocarbon stream comprising a defined hydrocarbon sulfur concentration and a defined hydrocarbon flow rate; (b) a second hydrocarbon stream in fluid communication with the defined stream, comprising a second sulfur concentration higher than the defined hydrocarbon sulfur concentration and a second flow rate; (c) a blended stream comprising a combination of the defined stream and the second hydrocarbon stream; (d) an IPU on which is stored a maximum sulfur concentration for the defined stream, programmed to calculate a ratio or rate at which the second hydrocarbon stream can be added to the defined stream based on the maximum sulfur concentration and a measured sulfur concentration of the defined stream, the second hydrocarbon stream, or the blended stream; (e) a sampler and a sulfur analyzer at a defined stream, second hydrocarbon stream or blended stream sampling point in electronic communication with the IPU, electronically configured to withdraw samples from the defined stream, second hydrocarbon stream or blended stream, measure the sulfur concentration of the defined stream, second hydrocarbon stream or blended stream, and transmit or make accessible the measured sulfur concentration to the IPU; and (f) a flow regulator interposed between the defined hydrocarbon and second hydrocarbon streams, in electronic communication with the IPU, electronically configured to receive or access the rate or ratio from the IPU and adjust the second flow rate without exceeding the rate or ratio.

In a fourth principal embodiment, the invention provides a method for blending off high sulfur hydrocarbons into lower sulfur hydrocarbon streams comprising: a) providing the system of the third principal embodiment, as modified by any of the subembodiments; b) withdrawing samples periodically by the sampler from the second hydrocarbon stream or blended stream, measuring the actual sulfur concentrations of the second hydrocarbon stream or blended stream by the analyzer, and transmitting or making accessible via the electronic communication the sulfur concentration to the IPU; c) calculating on the IPU a ratio or rate at which the second hydrocarbon stream can be added to the defined hydrocarbon stream based on the maximum sulfur concentration and the sulfur concentration of the second hydrocarbon stream or blended stream; d) receiving or accessing the ratio or rate by the flow regulator from the IPU, and adjusting the second flow rate through the flow regulator without exceeding the rate or ratio.

In other principal embodiments, the methods and systems are practiced in conjunction with a transmix splitter for generating two or more transmix fractions, typically a transmix distillate fraction and a transmix gasoline fraction. Thus, in a fifth principal embodiment the invention provides a system for recycling petroleum transmix comprising: a) a transmix supply comprising distillate transmix and gasoline transmix; b) a hydrocarbon splitter in fluid communication with the transmix supply, capable of splitting the distillate transmix and gasoline transmix based on boiling point; c) piping exiting the splitter configured to direct distillate transmix toward a flow regulator, wherein the distillate transmix has a sulfur concentration and a flow rate; d) a recipient distillate stream comprising a recipient sulfur concentration and a recipient flow rate; e) an IPU on which is stored a maximum sulfur concentration for the recipient distillate stream, programmed to calculate a ratio or rate at which the distillate transmix can be added to the recipient distillate stream based on the maximum sulfur concentration and the actual sulfur concentration of the distillate transmix stream; f) a sampler and a sulfur analyzer at a distillate transmix sampling point in fluid communication with the transmix distillate and in electronic communication with the IPU, electronically configured to withdraw samples periodically from the transmix distillate, measure the sulfur concentration of the sample, and transmit or make accessible the sulfur concentration to the IPU; and g) a flow regulator interposed between the recipient distillate stream and the transmix distillate, in electronic communication with the IPU, electronically configured to receive or access the ratio from the IPU and adjust the rate at which the transmix distillate is added to the recipient distillate stream without exceeding the rate or ratio.

In a sixth principal embodiment the invention provides a method for recycling petroleum transmix comprising: a) providing the system of the fifth principal embodiment, as modified by any of the subembodiments; b) providing a transmix supply comprising gasoline transmix and distillate transmix; c) separating the gasoline transmix and the distillate transmix in the splitter based on boiling point; d) transmitting the transmix distillate through piping exiting the splitter toward the flow regulator; e) withdrawing samples periodically by the sampler of the transmix distillate, measuring the actual sulfur concentration of the sample by the analyzer, and transmitting or making accessible via the electronic communication the sulfur concentration to the IPU; f) calculating on the IPU a ratio or rate at which the transmix distillate can be added to the recipient transmix stream based on the maximum sulfur concentration and the actual sulfur concentration of the transmix distillate; and g) receiving or accessing the ratio or rate by the flow regulator from the IPU, and adjusting the second flow rate through the flow regulator without exceeding the rate or ratio.

Additional advantages of the invention are set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION

Definitions and Use of Terms

Figure 1:
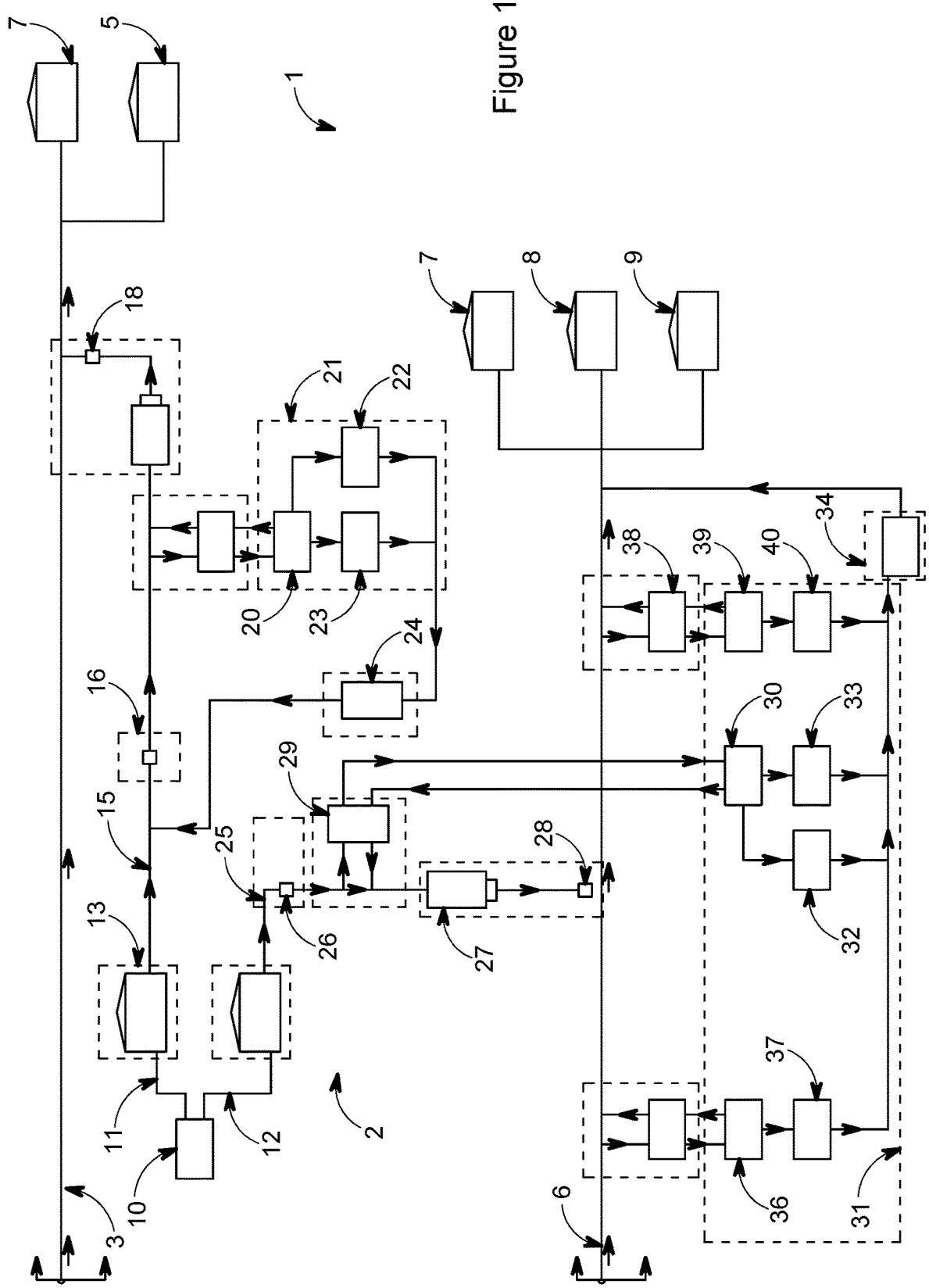
FIG. 1 is a plan layout of a petroleum tank farm including a transmix recycling system of the present invention, suitable for splitting transmix generated at the tank farm into two fractions and blending those fractions into pre-existing low sulfur diesel and gasoline streams.

Throughout this application, various publications are referenced. The disclosures of these publications in their entireties are hereby incorporated by reference into this application in order to more fully describe the state of the art to which this invention pertains. The references disclosed are also individually and specifically incorporated by reference herein for the material contained in them that is discussed in the sentence in which the reference is relied upon.

As used in the specification and claims, the singular forms a, an, and the include plural references unless the context clearly dictates otherwise. For example, the term "a specification" refers to one or more specifications for use in the presently disclosed methods and systems. "A hydrocarbon" includes mixtures of two or more such hydrocarbons, and the like. The word "or" or like terms as used herein means any one member of a particular list and also includes any combination of members of that list.

As used in this specification and in the claims which follow, the word "comprise" and variations of the word, such as "comprising" and "comprises," means "including but not limited to," and is not intended to exclude, for example, other additives, components, integers or steps. When an element is described as comprising one or a plurality of components, steps or conditions, it will be understood that the element can also be described as "consisting of" or "consisting essentially of" the component, step or condition, or the plurality of components, steps or conditions.

When used herein the term "about" will compensate for variability allowed for in the petroleum industry and inherent in hydrocarbon products. In one embodiment the term allows for any variation within 5% of the recited specification or standard. In one embodiment the term allows for any variation within 10% of the recited specification or standard.

When percentages, concentrations or other units of measure are given herein, it will be understood that the units of measure are weight percent unless otherwise stated to the contrary.

When flow rates are expressed herein, or relative flow rates such as percent additions are expressed herein, it will be understood that the flow rate is a volumetric flow rate unless otherwise stated.

When ranges are expressed herein by specifying alternative upper and lower limits of the range, it will be understood that the endpoints can be combined in any manner that is mathematically feasible. Thus, for example, a range of from 50 or 80 to 100 or 70 can alternatively be expressed as a series of ranges of from 50 to 100, from 50 to 70, and from 80 to 100. When a series of upper bounds and lower bounds are related using the phase "and" or "or", it will be understood that the upper bounds can be unlimited by the lower bounds or combined with the lower bounds, and vice versa. Thus, for example, a range of greater than 40% and/or less than 80% includes ranges of greater than 40%, less than 80%, and greater than 40% but less than 80%.

When an element of a process or thing is defined by reference to one or more examples, components, properties or characteristics, it will be understood that any one or combination of those components, properties or characteristics can also be used to define the subject matter at issue. This might occur, for example, when specific examples of an element are recited in a claim (as in a Markush grouping), or an element is defined by a plurality of characteristics. Thus, for example, if a claimed system comprises element A defined by elements A1, A2 and A3, in combination with element B defined by elements B1, B2 and B3, the invention will also be understood to cover a system defined by element A without element B, a system in which element A is defined by elements A1 and A2 in combination with element B defined by elements B2 and B3, and all other possible permutations.

"ASTM" refers to the American Society for Testing and Materials. Whenever a petroleum subtype is referenced herein, it will be understood that the subtype is defined by its normally accepted meaning, and that it can also be more specifically defined by specifications and testing methods prescribed by ASTM in its various publications. Thus, for example, aviation turbine fuel can be defined with reference to ASTM 1655-15de1, and diesel fuels can be defined with reference to ASTM D975-15c. When a product is defined by an ASTM standard for a particular petroleum subtype, it will be understood that the product need not have been tested according to the ASTM standard to satisfy the standard. Unless otherwise indicated, when reference is made to an ASTM standard herein, it is made in reference to the ASTM standard in effect on Jan. 1, 2019, and the ASTM standard is incorporated herein by reference.

The term "distillate" as used herein refers to those fuels commonly referred to as "middle distillates" in the petroleum industry. "Middle distillates" is a term commonly assigned to petroleum products obtained in the "middle" boiling range from about 180° C.-360° C. during the process of crude oil distillation. They are also called middle distillates because the products are removed at mid-height in the distillation tower during the multi-stage process of thermal separation. A middle distillate is typically a clear, colorless to light yellow, combustible liquid. It typically has between eleven and eighteen carbon atoms, a density of not more than 0.876 kg/1 at 15° C., and a flashpoint above 38° C. Middle distillates primarily include diesel fuel, marine fuels, aviation turbine fuel, non-aviation turbine fuel, heating oil, and kerosene.

The term "diesel fuel" as used herein means a petroleum-derived liquid fuel used in diesel engines, whose fuel ignition takes place without any spark as a result of compression of the inlet air mixture and injection of fuel. Diesel fuel is a mixture of hydrocarbons with boiling points typically in the range of 200 to 380° C. Diesel fuel utilized in the present invention preferably satisfies the testing requirements specified in ASTM D975. "Ultra-low sulfur diesel" refers to diesel having a sulfur content less than 15 ppm. "Low sulfur diesel" refers to diesel having a sulfur content less than 500 ppm.

"Finished Gasoline" and "Finished Motor Gasoline" are used synonymously, and refer to gasoline that is suitable for burning in spark-ignition vehicles without further modifications. Finished gasoline will typically satisfy ASTM Specification D 4814 or Federal Specification VV-G-1690C, and is characterized as having a boiling range of 122 to 158 degrees Fahrenheit at the 10 percent recovery point to 365 to 374 degrees Fahrenheit at the 90 percent recovery point.

"Gasoline" and "Motor Gasoline" are used synonymously. Gasoline is a complex mixture of relatively volatile hydrocarbons with or without small quantities of additives, blended to form a fuel suitable for use in spark-ignition engines. The term includes finished gasoline, as well as fuels that are intended to be mixed with oxygenates such as ethanol and MTBE. Gasoline thus includes conventional gasoline; oxygenated gasoline such as gasohol; reformulated gasoline; reformulated blendstock for oxygenate blending; conventional blendstock for oxygenate blending; and aviation gasoline.

"Conventional Blendstock for Oxygenate Blending" or "CBOB" means motor gasoline blending components intended for blending with oxygenates to produce finished conventional motor gasoline.

"Reformulated Blendstock for Oxygenate Blending" or "RBOB" refers to motor gasoline blending components intended for blending with oxygenates to produce finished reformulated motor gasoline.

"Premium Blendstock for Oxygenate Blending" or "PBOB" refers to motor gasoline blending components intended for blending with oxygenates to produce premium finished reformulated motor gasoline.

"Conventional Gasoline" means finished motor gasoline not included in the oxygenated or reformulated gasoline categories. The term thus excludes RFG, RBOB, CBOB, and blendstocks.

"Reformulated Gasoline (RFG)" refers to finished gasoline formulated for use in motor vehicles, the composition and properties of which meet the requirements of the reformulated gasoline regulations promulgated by the U.S. Environmental Protection Agency under Section 211(k) of the U.S. Clean Air Act and in effect on Jan. 1, 2019. Reformulated gasoline excludes Reformulated Blendstock for Oxygenate Blending (RBOB).

"Aviation Gasoline," or "Avgas" is a complex mixture of relatively volatile hydrocarbons with or without small quantities of additives, blended to form a fuel suitable for use in aviation spark-ignition engines. Avgas comes in several grades, all manufactured to an ASTM standard (D910), with specific physical properties and specific permitted and required additives (such as Tetra-Ethyl Lead—TEL).

"Fluid communication" refers to the linkage of a pipe to a source of a fluid at the same facility. Optionally the linkage may be through a channel that can be closed or whose flow may be modulated as by a valve. The linkage may be by any of the following: a door or window on the side of the pipeline; a branching pipe in the pipeline; an injection-facilitating fixture in a joint of the pipeline; a smaller secondary pipe that extends into the interior of the pipeline; or any other means that permits a fluid to flow into the pipeline. Optionally the flow may be constant, variable, or intermittent. Thus, a first stream that is separate from a fractional transmix stream by a storage tank at the same facility would still be considered to be in fluid communication with the first stream. In certain preferred embodiments of the invention the fluid flow into the pipe by means of this linkage is capable of being modulated or stopped.

"Tank farm" means any facility that contains a number of large storage tanks for petroleum products, one or more pipelines originating off-site for delivering petroleum products to the tank farm, and typically including loading racks from which tanker trucks can be filled. The methods and systems of the current invention will commonly occur at a tank farm. A tank farm of the present invention will be downstream of a petroleum refinery.

"Informational database" or "IDB" refers to a data storing system which can receive, store and output data. The informational database communicates with or is accessible to other informational database(s), IPU(s), component(s), system(s) and device(s) encompassed by the methods and systems of the present invention. When an IDB is modified by the term "an," it will be understood that the invention contemplates that one or more IDB's may perform the function described for the IDB. In like manner, when text refers to two or more IDBs for performing distinct functions, without specifically stating that the IDBs are different, it will be understood that the two or more IDBs can be the same or different.

"Information processing unit" and "IPU" means a computational unit that is useful for at least one of accessing, receiving, processing, distributing and storing data. The IPU may receive data either passively or by affirmatively soliciting or searching for data on a separate information system. When an IPU is modified by the term "an," it will be understood that the invention contemplates that one or more IPU's may perform the function described for the IPU; that the same IPU can perform more than one of the functions described for IPUs in the relevant text; and that the functions described for IPUs in the relevant text can be distributed among multiple IPUs. Thus, when text refers to two or more IPUs for performing distinct functions, without specifically stating that the IPUs are different, it will be understood that the two or more IPUs can be the same or different.

When data or a signal is referred to herein as being transmitted between two IPUs or an IPU and an information database, or other words of like import such as "communicated" or "delivered" are used, it will be understood that the transmission can be indirect, as when an intermediate IPU receives and forwards the signal or data. It will also be understood that the transmission can be passive or active.

"Obtaining" data or other information means acquiring such information. In some embodiments information is obtained by making physical measurements. In other embodiments information is obtained by receiving measurement data from a separate source.

Discussion of Principal Embodiments

The invention can be defined based on several principal embodiments which can be combined in any manner physically and mathematically possible to create additional principal embodiments. In a first principal embodiment the invention provides a system for blending off transmix into a defined hydrocarbon stream without violating a pre-determined physical property limit comprising: (a) a defined hydrocarbon stream comprising a hydrocarbon flow rate, a hydrocarbon value for the physical property, and either distillate or gasoline; (b) a fractional transmix stream in fluid communication with the defined hydrocarbon stream comprising a fractional transmix stream flow rate, a fractional transmix stream value for the physical property, and either distillate or gasoline; (c) a blended stream comprising a combination of the fractional transmix stream and the hydrocarbon stream comprising a blended flow rate, a blended value for the physical property, and either distillate or gasoline; (d) an IPU on which is stored a maximum value of the physical property for the hydrocarbon stream, programmed to calculate a ratio or rate at which the fractional transmix stream can be added to the hydrocarbon stream based on the maximum value and a measured value for the physical property of at least one of the fractional transmix stream, the hydrocarbon stream, and the blended stream; (e) a sampler and a physical property analyzer at a sampling point on at least one of the fractional transmix stream, hydrocarbon stream or blended stream in electronic communication with the IPU, electronically configured to withdraw samples from the fractional transmix stream, hydrocarbon stream or blended stream, measure the physical property of the fractional transmix stream, hydrocarbon stream or blended stream, and transmit or make accessible the measured physical property to the IPU; and (f) a flow regulator interposed between the transmix and hydrocarbon streams, in electronic communication with the IPU, electronically configured to receive or access the rate or ratio from the IPU and adjust the transmix flow rate without exceeding the rate or ratio.

In a second principal embodiment the invention provides a method for blending off transmix into a defined hydrocarbon stream without violating a pre-determined physical property limit comprising: (a) providing the system of the first principal embodiment; (b) withdrawing samples periodically by the sampler from the defined hydrocarbon stream, the fractional transmix stream, or the blended stream, measuring the physical property of the hydrocarbon stream, the fractional transmix stream, or the blended stream by the analyzer, and transmitting or making accessible via the electronic communication the physical property measurement to the IPU; (c) calculating on the IPU a ratio or rate at which the fractional transmix stream can be added to the defined hydrocarbon stream based on the physical property limit and the physical property measurement of the hydrocarbon stream, the fractional transmix stream, or the blended stream; (d) receiving or accessing the ratio or rate by the flow regulator from the IPU, and adjusting the transmix flow rate through the flow regulator without exceeding the rate or ratio.

In a third principal embodiment the invention provides a system for blending off hydrocarbon sulfur into a defined hydrocarbon stream without violating a pre-determined sulfur concentration limit comprising: (a) a defined hydrocarbon stream comprising a defined hydrocarbon sulfur concentration and a defined hydrocarbon flow rate; (b) a second hydrocarbon stream in fluid communication with the defined stream, comprising a second sulfur concentration higher than the defined hydrocarbon sulfur concentration and a second flow rate; (c) a blended stream comprising a combination of the defined stream and the second hydrocarbon stream; (d) an IPU on which is stored a maximum sulfur concentration for the defined stream, programmed to calculate a ratio or rate at which the second hydrocarbon stream can be added to the defined stream based on the maximum sulfur concentration and a measured sulfur concentration of the defined stream, the second hydrocarbon stream, or the blended stream; (e) a sampler and a sulfur analyzer at a defined stream, second hydrocarbon stream or blended stream sampling point in electronic communication with the IPU, electronically configured to withdraw samples from the defined stream, second hydrocarbon stream or blended stream, measure the sulfur concentration of the defined stream, second hydrocarbon stream or blended stream, and transmit or make accessible the measured sulfur concentration to the IPU; and (f) a flow regulator interposed between the defined hydrocarbon and second hydrocarbon streams, in electronic communication with the IPU, electronically configured to receive or access the rate or ratio from the IPU and adjust the second flow rate without exceeding the rate or ratio.

In a fourth principal embodiment, the invention provides a method for blending off high sulfur hydrocarbons into lower sulfur hydrocarbon streams comprising: a) providing the system of the third principal embodiment, as modified by any of the subembodiments; b) withdrawing samples periodically by the sampler from the second hydrocarbon stream or blended stream, measuring the actual sulfur concentration of the second hydrocarbon stream or blended stream by the analyzer, and transmitting or making accessible via the electronic communication the sulfur concentration to the IPU; c) calculating on the IPU a ratio or rate at which the second hydrocarbon stream can be added to the defined hydrocarbon stream based on the maximum sulfur concentration and the sulfur concentrations of the second hydrocarbon stream or blended stream; d) receiving or accessing the ratio or rate by the flow regulator from the IPU, and adjusting the second flow rate through the flow regulator without exceeding the rate or ratio.

In a fifth principal embodiment the invention provides a system for recycling petroleum transmix comprising: a) a transmix supply comprising distillate transmix and gasoline transmix; b) a hydrocarbon splitter in fluid communication with the transmix supply, capable of splitting the distillate transmix and gasoline transmix based on boiling point; c) piping exiting the splitter configured to direct distillate transmix toward a flow regulator, wherein the distillate transmix has a sulfur concentration and a flow rate; d) a recipient distillate stream comprising a recipient sulfur concentration and a recipient flow rate; e) an IPU on which is stored a maximum sulfur concentration for the recipient distillate stream, programmed to calculate a ratio or rate at which the distillate transmix can be added to the recipient distillate stream based on the maximum sulfur concentration and the actual sulfur concentration of the distillate transmix stream; f) a sampler and a sulfur analyzer at a distillate transmix sampling point in fluid communication with the transmix distillate and in electronic communication with the IPU, electronically configured to withdraw samples periodically from the transmix distillate, measure the sulfur concentration of the sample, and transmit or make accessible the sulfur concentration to the IPU; and g) a flow regulator interposed between the recipient distillate stream and the transmix distillate, in electronic communication with the IPU, electronically configured to receive or access the ratio from the IPU and adjust the rate at which the transmix distillate is added to the recipient distillate stream without exceeding the rate or ratio.

In a sixth principal embodiment the invention provides a method for recycling petroleum transmix comprising: a) providing the system of the fifth principal embodiment, as modified by any of the subembodiments; b) providing a transmix supply comprising gasoline transmix and distillate transmix; c) separating the gasoline transmix and the distillate transmix in the splitter based on boiling point; d) transmitting the transmix distillate through piping exiting the splitter toward the flow regulator; e) withdrawing samples periodically by the sampler of the transmix distillate, measuring the actual sulfur concentration of the sample by the analyzer, and transmitting or making accessible via the electronic communication the sulfur concentration to the IPU; f) calculating on the IPU a ratio or rate at which the transmix distillate can be added to the recipient transmix stream based on the maximum sulfur concentration and the actual sulfur concentration of the transmix distillate; and g) receiving or accessing the ratio or rate by the flow regulator from the IPU, and adjusting the second flow rate through the flow regulator without exceeding the rate or ratio.

The blending can occur along a variable fuel transmission pipe (a/k/a multi-product pipeline) that transmits a plurality of different petroleum types, including gasoline (regular and premium), diesel fuel (various grades), heating oil, and/or aviation fuel. Alternatively, the blending can occur inside a pipe that is dedicated to the transmission of the fuel type associated with the defined hydrocarbon stream. For example, the blending can occur in a single fuel transmission pipe destined for an ultra-low sulfur diesel fuel storage tank or a single fuel transmission pipe destined for an ultra-low sulfur diesel fuel tanker truck. In one embodiment, the blending occurs in a circulatory loop, in a pipe that exits and returns to the same petroleum tank.

The flow rate of the recipient defined hydrocarbon stream can remain unchanged over time or it can vary. When the rate varies, measurements will preferably be taken of the defined hydrocarbon stream flow rate in real time, and the fractional transmix or second hydrocarbon stream addition rate calculated based on the actual flow rate of the defined hydrocarbon stream.

The rate at which the fractional transmix or second hydrocarbon stream is added to the defined hydrocarbon stream is preferably determined by the relative pressures of the defined hydrocarbon and second volumes at the flow regulator, with the fractional transmix or second hydrocarbon stream pressure higher than the defined hydrocarbon stream pressure. The pressure of the fractional transmix or second hydrocarbon stream is preferably under the control of a coordinated pump and valve system, as depicted in greater detail in the figures hereto.

Discussion of Subembodiments

The invention can further be understood with reference to various subembodiments which can modify any of the principal embodiments. It will be understood that these subembodiments can be combined in any manner that is both mathematically and physically possible to create additional subembodiments, which in turn can modify any of the principal embodiments. It will also be understood that any of the features of the methods of the present invention apply equally to the systems of the present invention, and vice versa. However, certain verbiage can be employed in the description of the systems of the present invention, which is more appropriate when defining a system.

Some subembodiments are directed toward the source of the defined hydrocarbon stream physical property value used to calculate the ratio or rate at which the second hydrocarbon stream is added to the defined hydrocarbon. In one subembodiment the physical property value of the defined hydrocarbon stream is an assumed value accessible to the IPU, and this assumed value is used in combination with the measured valued of the fractional transmix or second hydrocarbon stream or the blended stream to calculate the rate or ratio. This subembodiment is particularly useful when blending gasoline transmix into gasoline and the physical property value is a sulfur concentration. In another subembodiment the physical property value of the defined hydrocarbon stream is an actual value, and a sampler and analyzer for the physical property is in fluid communication with the defined hydrocarbon stream and in electronic communication with the IPU, electronically configured to withdraw samples periodically from the defined hydrocarbon stream, measure the physical property of the defined hydrocarbon stream, and transmit or make accessible the physical property value to the IPU. The value thus measured for the defined stream is then used in combination with the measured valued of the fractional transmix or second hydrocarbon stream or the blended stream to calculate the rate or ratio used for blending. It is preferred to use an actual sulfur concentration for the defined hydrocarbon stream when blending diesel/distillate transmix into a diesel stream.

Other subembodiments are directed toward the location to which the samples are returned to the system. Thus, in one subembodiment, the methods of the present invention comprise returning the samples to the fractional transmix or second hydrocarbon stream upstream of the fractional transmix or second hydrocarbon stream sampling point, and the systems comprise piping configured to accomplish this return. In another subembodiment the methods of the present invention comprise returning the samples to the defined hydrocarbon stream downstream of the flow regulator, and the systems comprise piping configured to accomplish this return.

Various subembodiments are directed toward the use of a splitter to divide a transmix supply into distinct transmix fractions or streams, prior to blending the fraction into a defined hydrocarbon stream. The transmix supply will commonly comprise middle distillates selected from diesel fuel, marine fuels, aviation turbine fuel, non-aviation turbine fuel, heating oil, and kerosene, and gasolines selected from conventional gasoline, oxygenated gasoline, reformulated gasoline, reformulated blendstock for oxygenate blending, conventional blendstock for oxygenate blending, and aviation gasoline. Most commonly the transmix will comprise a combination of gasoline subtypes and a combination of distillate subtypes. The transmix might also comprise subgrade gasoline, diluent, propane, pentane, butane, and combinations thereof, which will typically end up in either the gasoline or the distillate fraction after the splitting is performed depending on the boiling temperature of the petroleum subtype and the design and operation of the transmix splitter. In a particularly preferred embodiment, the transmix comprises a distillate fraction and a gasoline fraction, sometimes referred to herein as a "distillate stream" and a "gasoline stream." In various subembodiments, the transmix will comprise greater than 20, 50, 100, 250, or even 500 ppm sulfur.

The splitter can divide the transmix based on various chemical engineering techniques, including decantation, distillation, and liquid-liquid extraction, although distillation based on differences in boiling points of the fractions/components of the transmix is preferred. The splitter will commonly divide the transmix into gasoline transmix and distillate transmix fractions based on the difference in boiling points between these two types of petroleum.

In various subembodiments, the distillate transmix will comprise greater than 20, 50, 100, 250, or 500 ppm sulfur. The gasoline transmix will typically comprise greater than 20, 40, 60, or even 80 ppm sulfur. While there is typically no limit on the sulfur content of the transmix fraction, the gasoline transmix typically cannot comprise greater than 95 ppm sulfur. If the gasoline transmix does exceed a pre-specified sulfur limit, it can be returned to the splitter for further processing. This does not happen often, however, because the main source of sulfur in the transmix pool is distillate, especially aviation turbine fuel, and it has unexpectedly been discovered that sulfur does not readily migrate from distillate to gasoline.

Thus, when a splitter is employed, in one particular subembodiment, the systems of the present invention will further comprise (a) a transmix supply comprising the fractional transmix stream and a third hydrocarbon stream, wherein the second and third hydrocarbons have different boiling points; (b) a hydrocarbon splitter in fluid communication with the transmix supply, capable of splitting the second and third hydrocarbons based on boiling point; and (c) piping exiting the splitter configured to direct the second hydrocarbon stream toward the flow regulator. The methods of the present invention will further comprise: (a) providing a transmix supply comprising the second hydrocarbon and a third hydrocarbon, wherein the second and third hydrocarbons have different boiling points; (b) separating the second and third hydrocarbons in the splitter based on boiling point; and (c) transmitting the second hydrocarbon stream through piping exiting the splitter toward the flow regulator.

The splitter can partition the transmix into two, three, or more fractions, limited only by the splitter's principles of operation and the number of different components in the transmix. The transmix will typically be split into two fractions, most commonly a gasoline fraction and a distillate fraction. If we assume that the gasoline fraction constitutes the "fractional transmix stream" in the various embodiments of this invention, the distillate fraction will constitute an additional stream (a "third stream") that is preferably recycled into a like hydrocarbon stream. Even though this third stream will most likely violate one or more pre-set physical property limits on the recipient hydrocarbon stream, especially limits on sulfur, it will typically be blended into a like hydrocarbon stream in a process similar to that used to blend off the fractional transmix stream. Thus, in another subembodiment, the systems of the present invention further comprise piping exiting the splitter configured to direct the third stream toward a second system for blending off off-specification or high sulfur hydrocarbons. In this subembodiment, the methods of the present invention will further comprise transmitting the third stream through piping exiting the splitter toward a second system for blending off off-specification hydrocarbons or high sulfur hydrocarbons.

Notably, the first and second systems for blending off off-specification hydrocarbons can be different or integrated. An integrated system, for example, could use the same flow regulator to inject the third stream into the same defined hydrocarbon stream as the fractional transmix stream. In this example, the defined hydrocarbon stream would typically comprise temporally separated batches of distillate and gasoline, transmix gasoline and transmix distillate pipes exiting the splitter would both be in fluid communication with the defined hydrocarbon stream, under the control of one or more flow regulators. The IPU in this instance would typically be programmed to recognize the type hydrocarbon passing the flow regulator, and would signal the flow regulator(s) to only allow a like-type transmix to flow through the regulator(s).

In some systems, it is desirable to establish limits on the physical properties of the fractional transmix or second hydrocarbon stream, and to monitor the fractional transmix or second hydrocarbon stream before it has been blended into the defined hydrocarbon stream to ensure it complies with the applicable limits. If the fractional transmix or second hydrocarbon stream violates the limits, the system can be configured to return the fractional transmix or second hydrocarbon stream to the splitter. Pre-specified limits on the sulfur, particularly in gasoline transmix fractions, have already been mentioned, but limits on other physical properties can also be established including, for example, limits on octane, distillation temperature, Reid vapor pressure, molecular weight distributions, flash point, and API gravity. Thus, for example, it can be particularly useful to analyze gasoline transmix for molecular weight distributions, to ensure there is little contamination from the distillate transmix. In like manner, it can be very useful to analyze distillate transmix for flash point to ensure the transmix distillate's flash point falls within the specifications for the distillate stream (typically diesel specifications) into which the transmix distillate is blended.

Thus, in another subembodiment the systems and methods of the present invention further comprise (a) an IPU on which is stored a maximum sulfur concentration for the fractional transmix or second hydrocarbon stream, programmed to receive or access the actual sulfur concentration of the fractional transmix or second hydrocarbon stream, and generate a diversion signal when the actual sulfur concentration exceeds the maximum sulfur concentration for the fractional transmix or second hydrocarbon stream; and (b) a diversion valve on the piping, electronically configured to receive or access the diversion signal, and configured to return the fractional transmix or second hydrocarbon stream to the hydrocarbon splitter in response to the diversion signal. In other subembodiments, the systems and methods of the present invention further comprise (a) an IPU on which is stored one or more limits on a physical property of the fractional transmix or second hydrocarbon stream selected from octane, distillation temperature, Reid vapor pressure, molecular weight distributions, and flash point, programmed to receive or access a measurement of the physical property of the fractional transmix or second hydrocarbon stream, and generate a diversion signal when the measurement violates the limit on the physical property for the fractional transmix or second hydrocarbon stream; (b) a sampler and analyzer in fluid communication with the fractional transmix or second hydrocarbon stream and in electronic communication with the IPU, electronically configured to withdraw samples periodically from the fractional transmix or second hydrocarbon stream, measure the physical property, and transmit or make accessible the measurement to the IPU; and (c) a diversion valve on the piping, electronically configured to receive or access the diversion signal, and configured to return the fractional transmix or second hydrocarbon stream to the hydrocarbon splitter in response to the diversion signal.

In some subembodiments the IPU used to determine whether to return the fractional transmix or second hydrocarbon stream to the splitter, and the IPU used to determine the rate or ratio at which the fractional transmix or second hydrocarbon stream can be added to the defined hydrocarbon stream, are the same. In other subembodiments, these IPUs are different.

In the systems and methods of the current invention, the fractional transmix or second hydrocarbon stream will typically have a sulfur concentration greater than the sulfur concentration of the defined hydrocarbon stream. In like manner, the third stream will typically have a sulfur concentration greater than the stream into which the third stream is blended. The sulfur concentration in the fractional transmix or second hydrocarbon stream can in various embodiments be more than 110%, 120%, 150%, 250%, 500%, 1,000%, 2,500%, or even 5,000% of the sulfur concentration of the defined hydrocarbon stream into which the fractional transmix or second hydrocarbon stream is blended. The fractional transmix or second hydrocarbon stream can in various embodiments be blended into the defined hydrocarbon stream at rates greater than 0.2%, 0.5%, 1%, 2%, 5%, 10%, 20%, or even 50% of the flow rate of the defined hydrocarbon stream.

When distillate transmix is blended into low sulfur diesel, the distillate transmix will commonly have a sulfur concentration more than 110%, 120%, 150%, 250%, or even 500% of the sulfur concentration of the low sulfur diesel, and can in various embodiments be blended into the low sulfur diesel at a rate greater than 1%, 2%, 5%, 10%, 20%, or even 50% of the flow rate of the low sulfur diesel stream. When distillate transmix is blended into ultra-low sulfur diesel, the distillate transmix will commonly have a sulfur concentration more than 120%, 150%, 250%, 500%, 1,000%, 2,500%, or even 5,000% of the sulfur concentration of the ultra-low sulfur diesel, and can in various embodiments be blended into the ultra-low sulfur diesel at a rate greater than 0.2%, 0.5%, 1%, 2%, 5% or even 10% of the flow rate of the low sulfur diesel stream.

When gasoline transmix is blended into gasoline, the gasoline transmix will commonly have a sulfur concentration more than 110%, 120%, 150%, 250%, or even 500% of the sulfur concentration of the recipient gasoline stream, and can in various embodiments be blended into the gasoline stream at a rate greater than 1%, 2%, 5%, 10%, 20%, or even 50% of the flow rate of the gasoline stream.

The systems are particularly versatile, and allow transmix fractions that comprise different types of petroleum within the same range of boiling points to be blended into a single stream type. Thus, for example, distillate transmix comprising two or more types of distillates can be blended into a diesel fuel stream comprising less than 500, 200, or 100 ppm sulfur, a low sulfur diesel stream comprising less than 100, 75, 50, or 25 ppm sulfur, or even an ultra-low sulfur diesel comprising less than 15, 10 or 5 ppm sulfur. A transmix distillate fraction can be blended into one of these types of diesel fuel even though the transmix distillate might comprise marine fuel, aviation turbine fuel, non-aviation turbine fuel, heating oil, kerosene, or a combination thereof, most likely aviation turbine fuel. The aviation turbine fuel in the transmix might comprise more than 250, 500, 1,000, 2,000, or even 5,000 ppm sulfur, while the distillate transmix might comprise more than 250, 500, 1,000, 2,000, or even 5,000 ppm sulfur.

In like manner gasoline transmix comprising two or more types of gasoline might be blended into a single type of gasoline. Thus, for example, gasoline transmix comprising two or more types of gasoline selected from conventional gasoline, oxygenated gasoline, RFG, RBOB, CBOB, and aviation gasoline, can be blended into a single type of gasoline selected from conventional gasoline, oxygenated gasoline, RFG, RBOB, CBOB, and aviation gasoline. The gasoline transmix will typically comprise more than 10, 15, 25, or 50 ppm sulfur, and/or less than 95 ppm sulfur. The recipient gasoline stream will typically comprise less than 50, 40, or 25 ppm sulfur, and most often will comprise less than 10 ppm sulfur.

The defined hydrocarbon and fractional transmix or second hydrocarbon streams typically comprise similar types of hydrocarbons, particularly in terms of having substantially the same boiling point and/or molecular weight distribution. In like manner, the third stream will typically comprise a similar type of hydrocarbon to the stream into which the third stream is blended, particularly in terms of having substantially the same boiling point and/or molecular weight distribution. Thus, in various subembodiments the defined hydrocarbon and fractional transmix or second hydrocarbon streams have substantially the same boiling point, and are both selected from the group consisting of distillates, gasolines, and petroleum blendstocks. In one subembodiment, the defined hydrocarbon stream is a gasoline stream and the fractional transmix or second hydrocarbon stream is a gasoline transmix stream. In another subembodiment, the defined hydrocarbon stream is a diesel stream and the fractional transmix or second hydrocarbon stream is a distillate transmix stream.

The systems and methods of the present invention can also be used to blend off high sulfur petroleum blendstocks, such as high sulfur propane, high sulfur butane, or high sulfur pentane, into a similar blendstock having a lower sulfur content. In a particularly preferred embodiment, the blendstock is butane. A common sulfur limit for butane is 10 ppm. Thus, as long as the butane in the defined hydrocarbon stream has a sulfur concentration less than 10 ppm, butane with a higher sulfur content can be blended into the defined hydrocarbon stream. In various embodiments, the second hydrocarbon stream can comprise butane having a sulfur concentration greater than 10 ppm, 25 ppm, 50 ppm, or even 100 ppm. The high sulfur butane can be blended into the recipient butane stream at a percentage greater than 0.25%, 0.5%, 1%, 2.5%, or even 5%.

In various subembodiments, the second hydrocarbon stream can comprise propane having a sulfur concentration greater than 10 ppm, 25 ppm, 50 ppm, or even 100 ppm. The high sulfur propane can be blended into the recipient propane stream at a percentage greater than 0.25%, 0.5%, 1%, 2.5%, or even 5%. In other subembodiments, the second hydrocarbon stream can comprise pentane having a sulfur concentration greater than 10 ppm, 25 ppm, 50 ppm, or even 100 ppm. The high sulfur pentane can be blended into the recipient pentane stream at a percentage greater than 0.25%, 0.5%, 1%, 2.5%, or even 5%.

The location of the sampler on the fractional transmix or second hydrocarbon stream is not critical to the invention, and depends primarily on the process used to control the blend ratio. Thus, in some systems and methods of the present invention the sampler is located on the fractional transmix or second hydrocarbon stream after it has been blended with the defined hydrocarbon stream downstream of the flow regulator. For clarity, the fractional transmix or second hydrocarbon stream downstream of the flow regulator will usually be referred to herein as the "blended" stream. However, it will be understood that the blended stream could also be referred to as the defined hydrocarbon stream or the fractional transmix or second hydrocarbon stream because the blended stream comprises a combination of the defined hydrocarbon stream and the fractional transmix or second hydrocarbon stream and is a continuation of each stream. When the sampler is located on the blended stream for controlling the blend rate or ratio, the systems or methods of the present invention would employ a feedback control mechanism to control the rate or ratio at which the fractional transmix or second hydrocarbon stream is blended into the defined hydrocarbon stream, and the rate of blending the fractional transmix or second hydrocarbon stream into the defined hydrocarbon stream would be calculated based on sulfur measurements taken downstream of the flow regulator.

In other systems and methods, the sampler is located on the fractional transmix or second hydrocarbon stream upstream of the flow regulator. For this location, the systems and methods would control the rate or ratio of blending by projecting the impact of the fractional transmix or second hydrocarbon stream on the sulfur content of the defined hydrocarbon stream. The rate of blending the fractional transmix or second hydrocarbon stream into the defined hydrocarbon stream can be calculated based on sulfur measurements, or assumptions of sulfur concentrations, taken upstream of the flow regulator by averaging the sulfur contribution of each stream. An exemplary formula is as follows:

$$SS_{FR}=((FS_{FR}+SS_{FR})(\text{target}_{s\%})-(FSR \times FS_{S\%}))/(SS_{s\%})$$

where:
$DHS_{FR}$=Defined hydrocarbon stream flow rate upstream of flow regulator
$DHS_{s\%}$=Sulfur % of defined hydrocarbon stream upstream of flow regulator
$SS_{FR}$=Fractional transmix or second hydrocarbon stream flow rate $SS_{s\%}$=Sulfur % of fractional transmix or second hydrocarbon stream $target_{s\%}$=Maximum permitted sulfur concentration in defined hydrocarbon stream In a preferred embodiment, particularly when blending distillate transmix into low sulfur or ultra-low sulfur diesel, sulfur measurements are taken upstream and downstream of the flow regulator. In this embodiment, the upstream measurement is used to determine the blending rate, while the downstream measurement is used for quality control to confirm the content of the blended stream. In this embodiment, a signal associated with the actual downstream sulfur content is preferably generated and communicated to an IPU to indicate whether the actual downstream sulfur content achieved the target sulfur content at a particular time point.

Thus, in some embodiments of the systems and methods of the present invention, a first sampler is located on the fractional transmix or second hydrocarbon stream upstream of the flow regulator, and the system further comprises a second sampler located on the blended stream downstream of the flow regulator, electronically configured to withdraw samples from the blended stream and transmit the blended samples to a sulfur analyzer.

In still other systems and methods, the blended stream is sampled and analyzed for physical properties other than sulfur after the blending step, typically for quality control purposes to ensure that the defined hydrocarbon stream maintains its specifications after the blending operation. Suitable physical properties include, for example, octane, distillation temperature, Reid vapor pressure, molecular weight distributions, flash point, and API gravity. Thus, in another subembodiment the systems and methods of the present invention further comprise a second sampler located on the blended stream downstream of the flow regulator, electronically configured to withdraw downstream samples from the blended stream and transmit the downstream samples to an analyzer for a physical property selected from octane, cetane distillation temperature, Reid vapor pressure, molecular weight distributions, flash point, and API gravity.

These downstream monitoring subembodiments are particularly well adapted to the generation of records which document the rate of addition or amount of sulfur in the blended stream, or other physical properties of the defined hydrocarbon stream post-blending. Thus, in one subembodiment the systems and methods further comprise measuring an actual downstream sulfur content or other physical property in the blended stream, associating in an information database the resulting actual downstream sulfur content or other physical property with a time point to provide associated temporal data; recording the associated temporal data in an informational database; and periodically repeating the process. In one particular subembodiment, the time point is received in the information database from an external source.

One or more of these physical properties can be monitored, depending on the type of petroleum, preferably at a frequency of at least every 10 minutes, five minutes, 60 seconds, 30 seconds, 15 seconds, or 10 seconds, regardless of the physical property being monitored and regardless of the stream being sampled (i.e. the defined hydrocarbon, second, third or blended stream). The hydrocarbon is preferably analyzed by: (a) withdrawing a sample of the hydrocarbon from the stream; (b) transmitting the sample to an analyzing unit; and (c) either returning the sample to system, or transmitting the sample to a separate storage unit.

A particularly suitable sulfur analyzer is the Sindie® 6010 On-line MWD XRF Analyzer by XOS® products. Flash point is suitably analyzed by a FDA-5™ Flash Point Analyzer by Bartec Top Holding GmbH. Molecular weight is suitably analyzed by a MAXUM™ gas chromatograph by Siemens Analytical Products.

Near Infra-Red (NIR) Spectroscopy

NIR spectroscopy is an everyday tool used by the oil and gas industry. NIR does not require any specific sample preparation, requires short acquisition time, and allows performing an online measurement in a non-intrusive way. This is critical for the oil and gas industry since the product, as crude oil or refined fuel, remains almost its entire lifetime in pipelines.

To perform an NIR online measurement there are two possibilities. Either an immersion probe or a flow cell is used. Immersion probes are most widely used for Fourier transform near infrared (FT-NIR) measurements in process control and can work in a transmission mode or a reflection depending on the transmittance of the sample. For crude oil, reflectance will be typically used, while, for refined fuels, transmission can be the most appropriate. Besides immersion probes, flow cells are widely used. In this case, the sample flows directly through the cell where the spectrum is measured and measurement is done exclusively in transmission mode. Typically, a flow cell probe allows one to acquire the spectra of a fluid flowing in a pipeline at a high pressure, while the immersion probe is designed to measure at pressures close to atmospheric.

A large number of properties are measured with NIR spectroscopy these days at refineries with the final goal of ensuring quality or optimizing the production process. Those properties include, without limitation, RON (research octane number), MON (motor octane number), cetane index, % aromatics, % olefins, % benzene and % oxygenates, to RVP (Reid vapor pressure), D10%, D50%, D90%, Pour Point, Cloud Point, and Cold Filter Plugging Point or E170. Suitable NIR analyzers are the OMA 300 by Applied Analytical, having a spectral range of 400-1100 nm, ANALECT® PCM™ Series by Applied Instrument Technologies, having a spectral range of 833-8333 nm, the HP260X by ABB, having a spectral range of 714-2630 nm, the XDS Process Analytics™ by FOSS NIR Systems Inc., having a spectral range of 800-2200 nm, and the PetroScan™ by Light Technology Industries, Inc., having a spectral range of 1200-2400 nm.

Chemometrics

"Chemometrics" is a term applied to the generic discipline containing computers and mathematics to derive meaningful chemical information from samples of varying complexity (Workman, J. J., Jr (2008) NIR spectroscopy calibration basic. In: Burns, D. A. and Ciurczak, E. W. (eds), Handbook of Near-Infrared Analysis, 3rd edn. CRC Press, Boca Raton, FL). In chemometrics, a computer is tasked with interpreting NIR spectra from a plurality of samples using a variety of multivariate mathematical techniques. These techniques are used to produce a mathematical calibration model.

In routine NIR analysis, the spectra should be pretreated to enhance informative signals of the interested components and reduce uninformative signals as much as possible (Pantoja P A et al., Application of Near-Infrared Spectroscopy to the Characterization of Petroleum, in Analytical Characterization Methods for Crude Oil and Related Products, First Edition. Edited by Ashutosh K. Shukla. Published 2018 by John Wiley & Sons Ltd.). Smoothing, multiplicative scatter correction, mean centering, and Savitzky-Golay derivation are commonly applied to pretreat the spectra before modeling in order to remove the scattering effect created by diffuse reflectance and to decrease baseline shift, overlapping peak, and other detrimental effects on the signal-to-noise ratio (Boysworth, M. K. and Booksh, K. S. (2008) Aspects of multivariate calibration applied to near-infrared spectroscopy. In: Burns, D. A. and Ciurczak, E. W. (eds), Handbook of Near-Infrared Analysis, 3rd edn. CRC Press, Boca Raton, FL.).

NIR spectra are ultimately calibrated to relate the observed spectra, in a predictive manner, to a property of interest. With calibration it is possible to predict relevant physicochemical properties of an unknown hydrocarbon that compare accurately with reference information on these properties. In the process of this invention, the reference information is generated from pipeline samples taken simultaneously with spectral information on the pipeline to generate a chemometric dataset. The main calibration methods, as described by Lopez-Gejo et al., 2008, include principal component analysis (PCA), partial least squares (PLS) regression, and artificial neural networks (ANNs) (Lopez-Gejo, J., Pantoj a, P. A., Falla, F. S., et al. (2008) Electronical and vibrational spectroscopy. In: Petroleum Science Research Progress, Publisher, Inc., 187-233).

Thus, in other methods and systems of the present invention, the hydrocarbon value for said physical property is obtained by generating a spectral response of said defined hydrocarbon stream using absorption spectroscopy with a near infrared analyzer, and comparing said spectral response to a chemometric dataset specific for said physical property in said defined hydrocarbon stream.

In other methods and systems of the present invention, said transmix value for said physical property is obtained by generating a spectral response of said fractional transmix stream using absorption spectroscopy with a near infrared analyzer, and comparing said spectral response to a chemometric dataset specific for said physical property in said fractional transmix stream.

In still further methods and systems of the present invention, the chemometric dataset is built by taking two or more samples of said defined hydrocarbon or fractional transmix from a pipeline; measuring said physical property of the samples offline; simultaneously with taking the two or more samples, obtaining a spectral response of the defined hydrocarbon or the fractional transmix in the pipeline using absorption spectroscopy with a near infrared analyzer; and correlating the spectral response with the measured physical property of the samples.

Discussion of Depicted Embodiments

Figure 2:
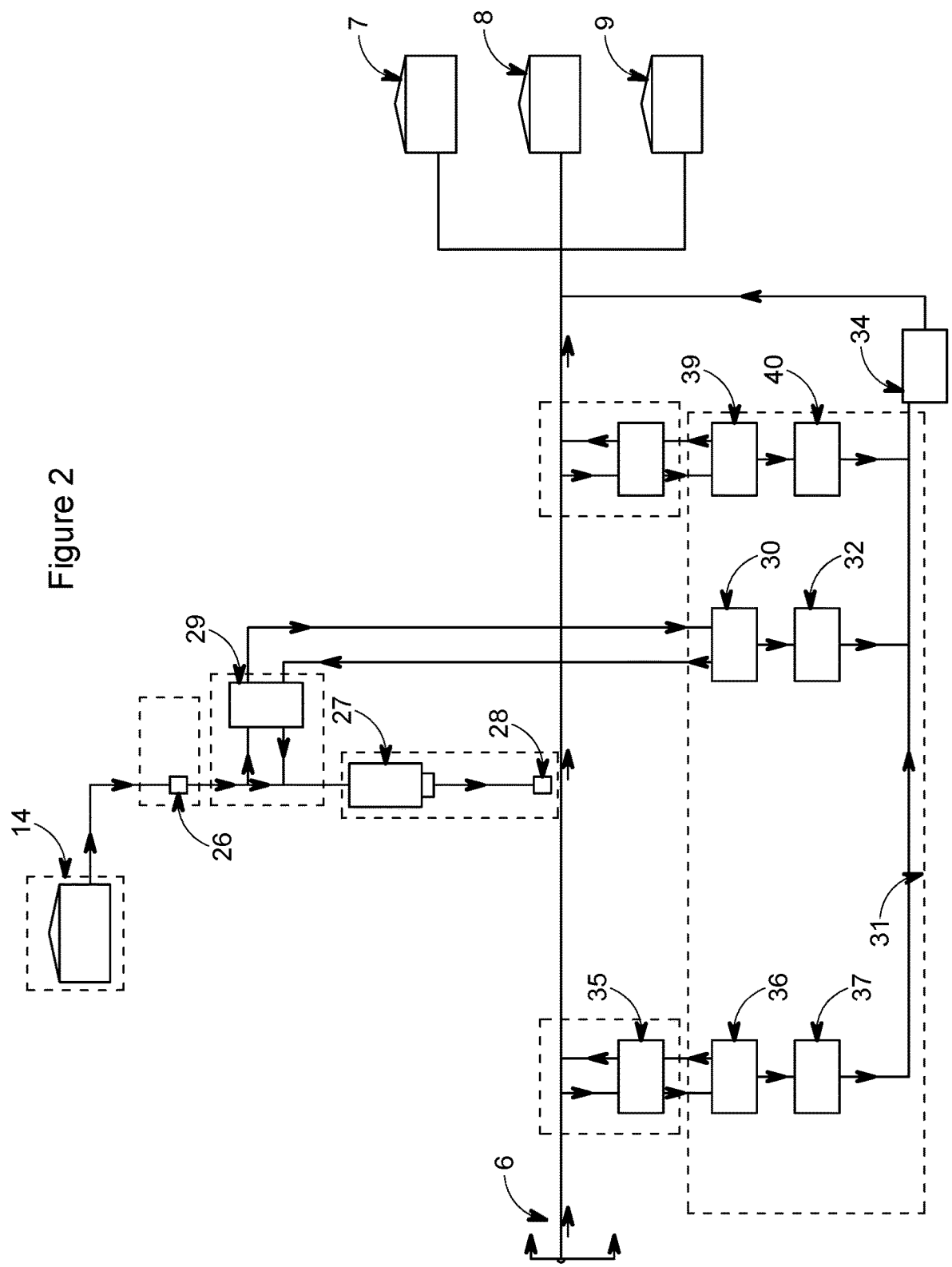
FIG. 2 is a plan layout of a petroleum tank farm including a transmix recycling system of the present invention useful for blending a transmix distillate fraction into a low sulfur diesel stream.

Reference is made to FIGS. 1 and 2 for a fuller understanding of the present invention. FIG. 1 is a plan layout of a petroleum tank farm/distribution facility 1 that has installed a transmix recycling system 2 of the present invention. Tank farm 1 includes a gasoline line 3 that supplies gasoline to storage tanks 4 and 5. Gasoline line 3 might originate on-site from another tank not shown in FIG. 1, from storage tank 4 or 5, or an off-site pipeline. The line can carry any type of gasoline as defined in this document, including conventional gasoline, reformulated gasoline, CBOB, and RBOB. The different types of gasoline will typically be separated into gasoline storage tanks 4 and 5 dedicated to specific gasoline types.

Tank farm 1 further includes a low sulfur diesel line 6 that supplies low sulfur diesel to storage tanks 7, 8, and 9. As with gasoline line 3, diesel line 6 might originate on-site from another tank not shown in FIG. 1, from storage tanks 7, 8, or 9, or from an off-site pipeline. In SOME applications, diesel line 6 will derive from a trunk line that also supplies gasoline line 3. Diesel line 6 could carry low sulfur diesel with differing sulfur specifications, but in some embodiments will carry ultra-low sulfur diesel that contains 15 ppm sulfur or less.

Transmix recycling system 2 begins with a transmix splitter 10 in FIG. 1, which in typically supplied from a separate transmix storage tank not shown in FIG. 1. Transmix splitter 10 is preferably a distillation unit that splits the transmix into a higher boiling gasoline line 11 that sends transmix gasoline to tank 13 and a lower boiling distillate or diesel line 12 that sends transmix distillate or diesel to tank 14. A transmix gasoline line 15 exits tank 13 and is transmitted via pump 16 toward an injection skid 17 and a blocking valve 18 (a/k/a "flow regulator") that regulates the flow of transmix gasoline into gasoline line 3.

The gasoline transmix flowing through line 15 is periodically sampled and analyzed using a product fast loop 19 that circulates gasoline transmix samples from and to gasoline transmix line 15, and to and from dual sample conditioner panel 20 in analyzer building 21. Samples of transmix gasoline are periodically forwarded from conditioner panel 20 to GC (gas chromatogram) analyzer 22 for measuring the molecular weight fractions of the transmix gasoline, or sulfur analyzer 23 for measuring the sulfur concentration of the transmix gasoline. After the transmix gasoline sample is analyzed in the GC analyzer 22 or sulfur analyzer 23, it is transmitted to a sample recovery unit 24 and from there returned to gasoline transmix line 15. In operation, blocking valve 18 will control the rate or ratio at which transmix gasoline is blended into gasoline line 3 based on the sulfur concentration of the transmix gasoline determined in sulfur analyzer 23.

Transmix recycling system 2 further includes a transmix distillate/diesel line 25 leading from the transmix distillate/diesel tank 14, which for simplification will be referred to as transmix diesel line 25. Transmix diesel line 25 is transmitted via pump 26 to injection skid 27 and a blocking valve 28 that regulates the flow of transmix diesel into low sulfur diesel line 6. The diesel transmix flowing through line 25 is periodically sampled and analyzed using a product fast loop 29 that circulates diesel transmix samples from and to diesel transmix line 25, and to and from dual sample conditioner panel 30 in analyzer building 31. Samples of diesel transmix are periodically forwarded from conditioner panel 30 to flashpoint analyzer 32 for measuring the flashpoint of the transmix diesel, or sulfur analyzer 33 for measuring the sulfur concentration of the transmix diesel. After the transmix diesel is analyzed in the flashpoint analyzer 32 or sulfur analyzer 33, it is transmitted to sample recovery unit 34 and from there returned to low sulfur diesel line 6.

The transmix diesel recycling component depicted in FIG. 1 further includes two separate sampling and analyzing systems for analyzing the sulfur content of low sulfur diesel line 6 upstream and downstream of blocking valve 28. The low sulfur diesel flowing through line 6, upstream and downstream of blocking valve 28, is periodically sampled and analyzed using product fast loops 35 and 38 that circulate low sulfur diesel from and to low sulfur diesel line 6, and to and from dual sample conditioner panels 36 and 39 in analyzer building 31. Samples of the low sulfur diesel are periodically forwarded from conditioner panels 36 and 39 to sulfur analyzers 37 and 40 for measuring the sulfur concentration of the low sulfur diesel. After the low sulfur diesel is analyzed in analyzer 37 or 40, it is transmitted to sample recovery unit 34 and eventually returned to low sulfur diesel line 6. In most cases, the sulfur concentrations determined at sulfur analyzer 37 (the low sulfur diesel stream) and sulfur analyzer 33 (the transmix diesel stream) will be used to calculate the rate or ratio at which transmix diesel can be blended with the low sulfur diesel, and the sulfur concentration determined at sulfur analyzer 40 will be used to confirm that the concentration of sulfur in the low sulfur diesel line post-bending does not exceed the sulfur limit set for the low sulfur diesel.

FIG. 2 depicts nearly the same transmix distillate recycling system as depicted in FIG. 1, except that there is no flashpoint analyzer 32 for measuring the flashpoint of the transmix diesel stream 25. In addition, the splitter 10 for generating the transmix distillate is not shown. The tank of transmix diesel 14 could thus originate off-site from a separate transmix processing facility, from an on-site splitter, or from any other source.

OTHER EMBODIMENTS

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for blending hydrocarbon sulfur into a defined hydrocarbon stream without violating a pre-determined sulfur concentration limit comprising:
   a) a defined hydrocarbon stream comprising a defined hydrocarbon sulfur concentration and a defined hydrocarbon flow rate;
   b) a second hydrocarbon stream in fluid communication with the defined stream, comprising a second sulfur concentration higher than the defined hydrocarbon sulfur concentration and a second flow rate;
   c) a blended stream comprising a combination of the defined stream and the second hydrocarbon stream;
   d) an IPU on which is stored a maximum sulfur concentration for the defined stream, programmed to calculate a ratio or rate at which the second hydrocarbon stream can be added to the defined stream based on the maximum sulfur concentration and a measured sulfur concentration of the defined stream, the second hydrocarbon stream, or the blended stream;
   e) a sampler and a sulfur analyzer at a defined stream, second hydrocarbon stream or blended stream sampling point in electronic communication with the IPU, electronically configured to withdraw samples from the defined stream, second hydrocarbon stream or blended stream, measure the sulfur concentration of the defined stream, second hydrocarbon or blended stream, and transmit or make accessible the measured sulfur concentration to the IPU; and
   f) a flow regulator interposed between the defined hydrocarbon and second hydrocarbon streams, in electronic communication with the IPU, electronically configured to receive or access the rate or ratio from the IPU and adjust the second flow rate without exceeding the ratio or rate;
   wherein the defined hydrocarbon stream, the second hydrocarbon stream, and the blended stream comprise distillate; and
   wherein the sampler is located on the blended stream downstream of the flow regulator, or the second hydrocarbon stream upstream of the flow regulator.

2. The system of claim 1, wherein the sulfur concentration of the defined hydrocarbon stream is used to calculate the rate or ratio in addition to the sulfur concentration of the second hydrocarbon stream or the blended stream, and the sulfur concentration of the defined hydrocarbon stream is an assumed concentration accessible to the IPU.

3. The system of claim 1, wherein the sulfur concentration of the defined hydrocarbon stream is also used to calculate the rate or ratio in addition to the sulfur concentration of the second hydrocarbon stream or the blended stream, and the sulfur concentration of the defined hydrocarbon stream is an actual concentration, further comprising a sampler and a sulfur analyzer in fluid communication with the defined hydrocarbon stream and in electronic communication with the IPU, electronically configured to withdraw samples from the defined hydrocarbon stream, measure the sulfur concentration of the defined hydrocarbon stream, and transmit or make accessible the sulfur concentration to the IPU.

4. The system of claim 1, further comprising:
   a) a transmix supply comprising the second hydrocarbon stream and a third hydrocarbon stream, wherein the second and third streams have different boiling points;
   b) a hydrocarbon splitter in fluid communication with the transmix supply and the defined hydrocarbon stream, capable of splitting the second and third streams based on boiling point; and
   c) piping exiting the splitter configured to direct the fractional transmix stream toward the flow regulator.

5. The system of claim 4, further comprising piping exiting the splitter configured to direct the third stream toward a second system for blending off high sulfur hydrocarbons.

6. The system of claim 4, further comprising:
   a) an IPU on which is stored one or more limits on a physical property of the second hydrocarbon stream selected from octane, distillation temperature, Reid vapor pressure, molecular weight distributions, flash point, and API gravity, programmed to receive or access a measurement of the physical property of the second hydrocarbon stream, and generate a diversion signal when the measurement exceeds the limit on the physical property for the second hydrocarbon stream;
   b) a sampler and analyzer in fluid communication with the second hydrocarbon stream and in electronic communication with IPU, electronically configured to withdraw samples periodically from the second hydrocarbon stream, measure the physical property, and transmit or make accessible the measurement to the IPU; and
   c) a diversion valve on the piping, electronically configured to receive or access the diversion signal, and configured to return the second hydrocarbon stream to the hydrocarbon splitter in response to the diversion signal.

7. The system of claim 1, wherein the second hydrocarbon stream has a sulfur concentration more than 150% greater than the sulfur concentration of the defined hydrocarbon stream.

8. The system of claim 1, wherein the defined hydrocarbon and second hydrocarbon streams have substantially the same boiling point.

9. The system of claim 1, wherein the defined hydrocarbon stream comprises low sulfur diesel and the second hydrocarbon stream comprises distillate transmix comprising aviation fuel.

10. A system for blending sulfur into a hydrocarbon stream without violating a pre-determined sulfur limit comprising:

a) a first hydrocarbon stream comprising a first sulfur concentration and a first flow rate;
b) a second hydrocarbon stream in fluid communication with the first stream, comprising a second sulfur concentration higher than the first sulfur concentration and a second flow rate;
c) a blended stream comprising all or a portion of the first and second hydrocarbon streams;
d) an IPU on which is stored a maximum sulfur concentration for the first stream, programmed to calculate a rate or ratio at which the second stream can be added to the first stream based on the maximum sulfur concentration and a measured sulfur concentration of the first hydrocarbon stream, the second hydrocarbon stream, or the blended stream;
e) a sulfur analyzer on the first stream, the second stream, or the blended stream, in electronic communication with the IPU, configured to measure a sulfur concentration, and transmit or make accessible the sulfur concentration to the IPU; and
f) a flow regulator interposed between the first and second hydrocarbon streams, in electronic communication with the IPU, electronically configured to receive or access the rate or ratio from the IPU and adjust the second flow rate without exceeding the rate or ratio.

11. The system of claim 10, wherein the first hydrocarbon stream comprises gasoline and the second hydrocarbon stream comprises gasoline transmix.

12. The system of claim 10, wherein the first stream comprises CBOB gasoline and the second hydrocarbon stream comprises gasoline transmix comprising RBOB.

13. The system of claim 10, wherein the first and second hydrocarbon streams consist essentially of butane.

14. The system of claim 1, wherein the sampler is located on the blended stream downstream of the flow regulator.

15. The system of claim 1, wherein the sampler is located on the second hydrocarbon stream upstream of the flow regulator.

16. The system of claim 1, wherein the sampler is located on the second hydrocarbon stream upstream of the flow regulator, further comprising a second sampler located on the blended stream downstream of the flow regulator, electronically configured to withdraw downstream samples from the defined hydrocarbon stream and transmit the downstream samples to a sulfur analyzer.

17. The system of claim 1, wherein the sampler is located on the second hydrocarbon stream upstream of the flow regulator, further comprising a second sampler located on the blended stream downstream of the flow regulator, electronically configured to withdraw downstream samples from the blended stream and transmit the downstream samples to an analyzer for a physical property selected from octane, distillation temperature, Reid vapor pressure, molecular weight distributions, flash point, and API gravity.

* * * * *